United States Patent
Trommer et al.

(10) Patent No.: US 7,955,715 B2
(45) Date of Patent: Jun. 7, 2011

(54) METHOD FOR COATING A COMPONENT FOR USE IN A CRUCIBLE DRAWING METHOD FOR QUARTZ GLASS, AND COATED COMPONENT OBTAINED ACCORDING TO THE METHOD

(75) Inventors: Martin Trommer, Schluechtern (DE); Rainer Berg, Langenselbold (DE); Nigel Whippey, Seligenstadt (DE); Helmut Leber, Hanau (DE); Joerg Becker, Niddatal (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 1170 days.

(21) Appl. No.: 11/642,349

(22) Filed: Dec. 20, 2006

(65) Prior Publication Data

US 2007/0178329 A1    Aug. 2, 2007

(30) Foreign Application Priority Data

Dec. 22, 2005   (DE) .......................... 10 2005 062 066

(51) Int. Cl.
*B32B 15/04* (2006.01)
*C03B 37/00* (2006.01)

(52) U.S. Cl. ........................... 428/655; 428/665; 65/492

(58) Field of Classification Search ........................ None
See application file for complete search history.

(56) References Cited

U.S. PATENT DOCUMENTS

| | | | | |
|---|---|---|---|---|
| 4,343,636 A * | 8/1982 | Bhatti | ............................ | 65/492 |
| 4,404,009 A * | 9/1983 | Bhatti et al. | .................... | 65/475 |
| 5,705,283 A * | 1/1998 | Upadhya | ........................ | 428/610 |
| 6,162,552 A * | 12/2000 | Bewlay et al. | ................. | 428/655 |
| 6,203,752 B1 * | 3/2001 | Bewlay et al. | .................... | 419/6 |
| 6,422,861 B1 | 7/2002 | Antczak et al. | | |
| 6,632,086 B1 | 10/2003 | Antczak et al. | | |
| 6,739,155 B1 | 5/2004 | Giddings et al. | | |

FOREIGN PATENT DOCUMENTS

JP    2022132 A    1/1990

OTHER PUBLICATIONS

Weihong et al., "Diffusion layer at the interface of W/Re-composite nozzles," High Temperatures-High Pressures, 1994, vol. 26, pp. 115-121.
espacenet English language abstract for JP 2022132, Jan. 25, 1990.

* cited by examiner

*Primary Examiner* — Aaron Austin
(74) *Attorney, Agent, or Firm* — Tiajoloff and Kelly LLP

(57) ABSTRACT

In a known method for coating a crucible for use at a high working temperature in a crucible drawing method for quartz glass, a base body wall of tungsten has applied thereto a protective layer containing a coating metal consisting of the group selected from iridium, rhenium, osmium and ruthenium. Starting therefrom, to provide a method for producing such a component exhibiting high corrosion resistance to the quartz glass melt at low material costs, it is suggested according to the invention that the protective layer should be produced from a layer material which contains tungsten and the coating metal, and in which the amount of the coating metal should be dimensioned such that it exceeds the limit amount of a coating metal-rich phase boundary of a solid mixture phase of tungsten and the coating metal, with the solid mixture phase being thermodynamically stable at the working temperature, by not more than 25 at. % (based on the total amount of tungsten and the coating metal in the layer material).

24 Claims, 2 Drawing Sheets

METHOD FOR COATING A COMPONENT FOR USE IN A CRUCIBLE DRAWING METHOD FOR QUARTZ GLASS, AND COATED COMPONENT OBTAINED ACCORDING TO THE METHOD

FIELD OF THE INVENTION

The present invention relates to a method for coating a component, particularly a crucible, for use at a high working temperature in a crucible drawing method for quartz glass, in that a base body of the component is provided comprising a wall of tungsten or of a tungsten-containing high temperature-resistant alloy, and at least part of the wall has applied thereto a protective layer which contains a coating metal of the group iridium, rhenium, osmium and ruthenium.

BACKGROUND OF THE INVENTION

Moreover, the invention is concerned with a component, particularly crucible, which is present prior to its intended use at a high working temperature in a crucible drawing method for quartz glass, which component comprises a base body comprising a wall of tungsten or a tungsten-containing high temperature-resistant alloy which is covered at least in part with a protective layer which contains a coating metal selected from the group consisting of iridium, rhenium, osmium and ruthenium.

Crucible drawing methods are standard methods in making cylindrical components of quartz glass with any desired cross-section. The crucible materials used therein are normally tungsten (W), molybdenum (Mo), or alloys thereof. However, these refractory metals are not completely corrosion-resistant to molten quartz glass and react at high temperatures with oxygen from the quartz glass. In this reaction, metal oxides are formed that are enriched on the crucible wall and in the bottom area of the crucible from where they are removed from time to time with the melt flow of the glass melt in a concentrated form and are then noticed as striae or discolorations and lead to waste, just like undissolved metal oxide particles in the quartz glass melt.

Although crucibles of high-melting metals of the group iridium, rhenium, osmium and ruthenium show a much better corrosion resistance to a quartz glass melt, they are very expensive. The formation of a crucible from iridium is for example suggested in JP 02-022132 A.

An alternative would be to apply a protective layer of metals of said group only onto the inside of a crucible otherwise consisting of tungsten or molybdenum. Crucibles of such a type are for example known from U.S. Pat. Nos. 6,632,086 B1, 6,422,861 B1 and 6,739,155 B1. It is suggested therein that the inside of the crucible should be provided with protective layers of iridium, rhenium, osmium or alloys of said coating metals. The protective layer is either metallurgically connected to the crucible wall, or it forms a separate insert member that rests on the crucible wall and is mechanically fixed to said wall. The thicknesses of such protective layers range from 0.5 mm to 1.27 mm.

The last-described crucible shows a better corrosion resistance to quartz glass melts. The material costs for making the crucibles are however very high because of the expensive coating metals for making the protective layer.

SUMMARY OF THE INVENTION

Starting from said prior art, it is the object of the present invention to provide a component for use in a crucible drawing method for quartz glass that exhibits a high corrosion resistance to the quartz glass melt at low material costs, and to indicate a method for producing such a component.

As for the method, this object starting from a method of the above-mentioned type is achieved according to the invention in that the protective layer is produced from a layer material which contains tungsten and the coating metal, and in which the amount of the coating metal is dimensioned such that it exceeds the limit amount of a coating metal-rich phase boundary of a solid mixture phase of tungsten and the coating metal, with the solid mixture phase being thermodynamically stable at the working temperature, by not more than 25 at. % (based on the total amount of tungsten and the coating metal in the layer material), i.e., the percentage of the total number of atoms that are tungsten.

The component to be coated is an article that gets into contact with hot $SiO_2$ during the drawing process. The crucible and its parts, such as nozzles or nozzle holders, shall here be mentioned by way of example, or pipes projecting into the quartz glass mass for the gas supply, enveloping bodies for measuring devices or mixing apparatus. The usual working temperature in the intended use of the component is clearly above 2000° C., normally in the temperature range between 2050° C. and 2300° C.

The base body consists essentially of high-temperature metals, with niobium, molybdenum and tantalum being suited, apart from tungsten.

The surface region of the base body that is in contact with the hot $SiO_2$ is provided fully or in part with a protective layer containing a coating metal. The coating metal is selected from the group iridium, osmium, ruthenium, rhodium, and rhenium.

The invention is based on the finding that in the intended use of a tungsten-containing base body coated with such a coating metal, a thermodynamically stable solid mixture phase is formed during heating to the working temperature, said solid mixture phase consisting of tungsten and the coating metal and being also just called "mixed or mixture phase" in the following.

If the chemical composition of the coating does not correspond to that of the thermodynamically stable mixture phase, as in the coatings known from the prior art, said phase will form in the intended use of the coated component at the working temperature, which is accompanied by diffusion processes in which tungsten atoms travel out of the base body into the coating with the coating metal, or vice versa. Atoms of the coating metal diffuse out of the coating into the base body. These diffusion processes will only be terminated for the most part if the thermodynamically stable balance state has been achieved. For instance, after the whole original coating consisting of pure coating metal has been converted into a layer with the composition of the stable mixture phase.

At any rate, the amount of the coating metal in the thermodynamically stable mixture phase is less than 100 at. %. In a phase diagram of tungsten and the corresponding coating metal, the area of the mixture phase is defined on the one hand by a phase boundary at the side that is rich in coating metal and on the other hand by a phase boundary at the tungsten-rich side of the phase diagram. Hence, the amount of coating metal ensuing in the thermodynamic balance is not higher than the limit amount of coating metal in the coating metal-rich phase boundary of the mixed phase region.

According to the invention it is not the pure coating metal (as described in the prior art) that is used for forming the protective layer, but a layer material that, apart from the coating metal, also contains tungsten and in the case of which the maximum amount of the coating metal is based on the coating metal-rich phase boundary of the mixed phase region in addition. The following effects are thereby achieved:

1. Saving Valuable Coating Metal

Less coating metal is needed for the formation of the protective layer. The amount saved may be considerable and, for example, account for more than 50%, as will be explained in detail further below with reference to an embodiment with iridium as the coating material.

The amount of valuable coating metal that has actually been saved depends, however, on the position of the mixed phase at the working temperature and particularly on the coating metal-rich phase boundary thereof.

According to the invention the amount of the coating metal in the layer material exceeds the limit amount in the area of said phase boundary by 25 at. % at the most (based on the total amount of tungsten and the coating metal in the layer material). In case of a deviation of more than 25 at. %, the amount of coating metal saved will be correspondingly lower and the positive effect of the invention as described hereinafter and under 2. will not take place to the desired extent.

2. Mechanical and Chemical Stability of the Protective Layer

Since the layer material used for making the protective layer already comprises a chemical composition that corresponds to that of the mixed phase at the working temperature or is at least approximated thereto, diffusion processes are minimized that otherwise might lead to defects in the area of the boundary between base body and protective layer and possibly to reduced adhesion of the protective layer.

Moreover, in the intended use of the component coated according to the invention, a reliable protective layer which is in thermodynamic balance is formed rapidly and reproducibly with properties that are constant over time.

Apart from the coating metal of relevance to the formation of the mixed phase, the protective layer may contain further alloying components, particularly one further metal or further metals selected from the group consisting of iridium, rhenium, osmium, and ruthenium. In cases where several solid phases are thermodynamically stable at the working temperature, each of said phases may be used within the meaning of the invention for adjusting the layer material. As a rule, however, that phase will be chosen as the mixed phase that is quantitatively prevailing.

It has turned out to be particularly advantageous when the amount of the coating metal in the layer material exceeds the limit amount of the coating metal-rich phase boundary of the thermodynamically stable solid mixture phase by not more than 15 at. %, preferably not more than 10 at. %.

An amount of coating metal that is as small as possible will save a greater amount of valuable metal. The more the amount of the coating metal in the layer material corresponds to the amount in the mixed phase in the thermodynamic balance state at the working temperature, the earlier and more efficiently will the effects stated above under 2. be achieved.

It has also turned out to be advantageous when the amount of the coating metal in the layer material is not more than 15 at. %, preferably not more than 5 at. %, below a limit amount of a tungsten-rich phase boundary of the solid mixture phase that is thermodynamically stable at the working temperature.

The coating metal portion in the layer material may be less than the limit portion in the area of the tungsten-rich phase boundary of the mixed phase. However, with respect to an adequately high stability and corrosion resistance of the protective layer, a coating metal portion in the layer material should be preferred that is not more than 15 at. %, and particularly not more than 5 at. %, below said limit portion.

A first variant of the method of the invention has turned out to be useful where the layer material contains iridium as the coating metal, the iridium amount (based on the total amount of tungsten and iridium in the layer material) being 50 at. % at the most, preferably 35 at. % at the most, and at least 5 at. %, preferably at least 15 at. %.

It has been found that in the two-component system tungsten/iridium at a typical working temperature around 2150° C. a thermodynamically stable phase (mixed phase) is formed that is distinguished by a comparatively low iridium content in the range of about 20-25 at. %. When a component having a tungsten-containing base body and an iridium-containing protective layer is used in a crucible drawing method for quartz glass, this mixed phase will be formed automatically. Therefore, a layer material with a high tungsten amount and a comparatively low iridium amount of not more than 50 at. % will be used. This yields the above-explained effects regarding the saving of coating metal for the formation of the protective layer and regarding the stability of the protective layer. This procedure will be explained in more detail further below with reference to FIG. 1.

In an alternative and equally preferred procedure, the layer material will contain rhenium as the coating metal, the rhenium amount (based on the total amount of tungsten and rhenium in the layer material) being not more than 90 at. %, preferably not more than 75 at. %, and at least 30 at. %, preferably at least 40 at. %.

It has been found that a thermodynamically stable mixed phase (sigma phase) is also formed in the two-component system tungsten/rhenium within the temperature range around 2150° C. The rhenium amount of said mixed phase is within the range of about 45-65 at. %. When a component having a tungsten-containing base body and a rhenium-containing protective layer is used in a crucible drawing method for quartz glass, said mixed phase will be formed automatically. Therefore, according to the invention a layer material will be used with a similar composition with respect to the quantitative ratio of tungsten and rhenium (as indicated above). The maximum rhenium amount of 90 at. % is less than in the prior art at 100%. Hence, in this embodiment of the invention the above-explained effects are also accomplished as regards the saving of coating metal for the formation of the protective layer and with respect to the stability of the protective layer. This procedure will be explained in more detail further below with respect to FIG. 2.

It has turned out to be useful when the layer material is applied by means of flame spraying or plasma spraying to the wall to be coated.

This yields a metallurgical bond between protective layer and wall, which has an advantageous effect on adhesion and corrosion resistance of the coating.

It has also turned out to be advantageous when the layer material is prepared from a powder mixture which contains tungsten powder and coating metal powder.

In this variant of the method, starting powders of the pure metals are used, so that the composition of the powder mixture for the formation of the protective layer can be easily adapted to changing requirements.

As an alternative and equally preferred, the layer material is made from an alloy containing tungsten and the coating metal.

In this variant of the method, a starting powder is used for the formation of the protective layer that consists of an alloy in which tungsten and the coating metal are present in the concentration ratio predetermined according to the invention.

The alloy can be produced via melting methods so that a particularly homogeneous distribution of the alloying components is ensured, which has an advantageous effect on the quality of the protective layer.

Apart from tungsten and the coating metal in question, the protective layer may also contain other components. However, with respect to a coating metal consumption that is as low as possible and with respect to a high stability of the protective layer, preference is given to an embodiment in which a layer material is used, of which at least 70% by wt., preferably at least 90% by wt., consist of the coating material and tungsten.

As for the component, the above-mentioned object, starting from a component of the above-mentioned type, is achieved according to the invention in that the protective layer consists of a layer material which contains tungsten and the coating metal, and in which the amount of the coating metal is dimensioned such that it exceeds the limit amount of a coating metal-rich phase boundary of a solid mixture phase of tungsten and the coating metal, with the solid mixture phase being thermodynamically stable at the working temperature, by not more than 25 at. % (based on the total amount of tungsten and the coating metal in the layer material).

The component according to the invention is optimized for use at a high working temperature in a crucible drawing method for quartz glass. To this end at least one wall of the component to be coated, for example the inner wall of a crucible, comprises a protective layer having a specific composition. What is essential is that said specific composition of the protective layer is already prepared before the intended use of the component and is e.g. not obtained later during use due to diffusion processes.

The component to be coated is an article that gets into contact with hot $SiO_2$ during the drawing process. The crucible and its parts, such as nozzles or nozzle holders, shall here be mentioned by way of example, or pipes projecting into the quartz glass mass for the gas supply, enveloping bodies for measuring devices or mixing apparatus. The working temperature in the intended use of the component is clearly above 2000° C., normally in the temperature range between 2050° C. and 2300° C.

The base body consists essentially of high-temperature metals, with niobium, molybdenum and tantalum being usable, apart from tungsten.

The surface region of the base body that is in contact with the hot quartz glass mass is provided fully or in part with a protective layer containing a coating metal. The coating metal is selected from the group consisting of iridium, osmium, ruthenium, rhodium, and rhenium.

As has already been stated above with reference to the method according to the invention, the invention is based on the finding that in the intended use of a tungsten-containing base body coated with a coating metal, a thermodynamically stable solid mixture phase is formed during heating to the working temperature, said solid mixture phase consisting of tungsten and the coating metal ("mixed phase").

If the chemical composition of the coating does not correspond to that of the thermodynamically stable mixed phase, as in the coatings known from the prior art, the formation of the mixed phase is accompanied by diffusion processes in which tungsten atoms travel out of the base body into the coating with the coating metal, or vice versa. Atoms of the coating metal diffuse out of the coating into the base body. These diffusion processes will only be terminated for the most part if the thermodynamically stable balance state has been achieved. This means for instance that the whole original coating consisting of pure coating metal has been converted into a layer with the composition of the stable mixed phase.

At any rate, the amount of coating metal in the thermodynamically stable mixed phase is less than 100 at. %. In a phase diagram of tungsten and the corresponding coating metal, the area of the mixed phase is defined on the one hand by a phase boundary at the side that is rich in coating metal and on the other hand by a phase boundary at the tungsten-rich side of the phase diagram. Hence, the amount of coating metal ensuing in the thermodynamic balance is thus not higher than the limit amount of coating metal in the coating metal-rich phase boundary of the mixed phase region.

According to the invention the protective layer prior to the intended use of the component does thus not consist of the pure coating metal (as described in the prior art), but is made from a layer material that, apart from the coating metal, also contains tungsten and in the case of which the maximum amount of the coating metal is based on the coating metal-rich phase boundary of the mixed phase region in addition. The following effects are thereby achieved.

1. Saving Valuable Coating Metal

The protective layer contains less coating metal. The amount saved may be considerable and, for example, account for more than 50%.

The amount of valuable coating metal that can actually be saved depends on the position of the mixed phase at the working temperature and particularly on its platinum metal group-rich phase boundary. According to the invention the amount of the coating metal in the layer material exceeds the limit amount in the area of said phase boundary by 25 at. % at the most (based on the total amount of tungsten and the coating metal in the layer material). In case of a deviation of more than 25 at. %, the amount of coating metal saved will be correspondingly lower and the positive effect of the invention as described hereinafter and under 2. will not take place to the desired extent.

2. Mechanical and Chemical Stability of the Protective Layer

Since the layer material already comprises a chemical composition that corresponds to that of the mixed phase at the working temperature or is at least approximated thereto, diffusion processes are minimized during heating of the component for the first time and in the intended use, such diffusion processes otherwise leading to defects in the area of the boundary between base body and protective layer and possibly to reduced adhesion of the protective layer.

Moreover, in the intended use of the component coated according to the invention, a reliable protective layer which is in the thermodynamic balance state is formed rapidly and reproducibly with properties that are constant over time.

Apart from the coating metal of relevance to the formation of the mixed phase, the protective layer may contain further alloying components, particularly one further metal of further metals selected from the group consisting of iridium, rhenium, osmium, and ruthenium. In cases where several solid phases are thermodynamically stable at the working temperature, each of said phases may be used within the meaning of the invention for adjusting the layer material. As a rule, however, that phase will be chosen as the mixed phase that is quantitatively prevailing.

BRIEF DESCRIPTION OF THE DRAWINGS

Advantageous developments of the component according to the invention become apparent from the subclaims. Insofar as developments of the component indicated in the subclaims copy the procedures indicated in subclaims regarding the inventive method, reference will be made to the corresponding method claims as a supplementary explanation with respect to the above observations.

The invention shall now be explained in more detail with reference to embodiments and a drawing, which shows in detail in.

DETAILED DESCRIPTION

Figure 1:
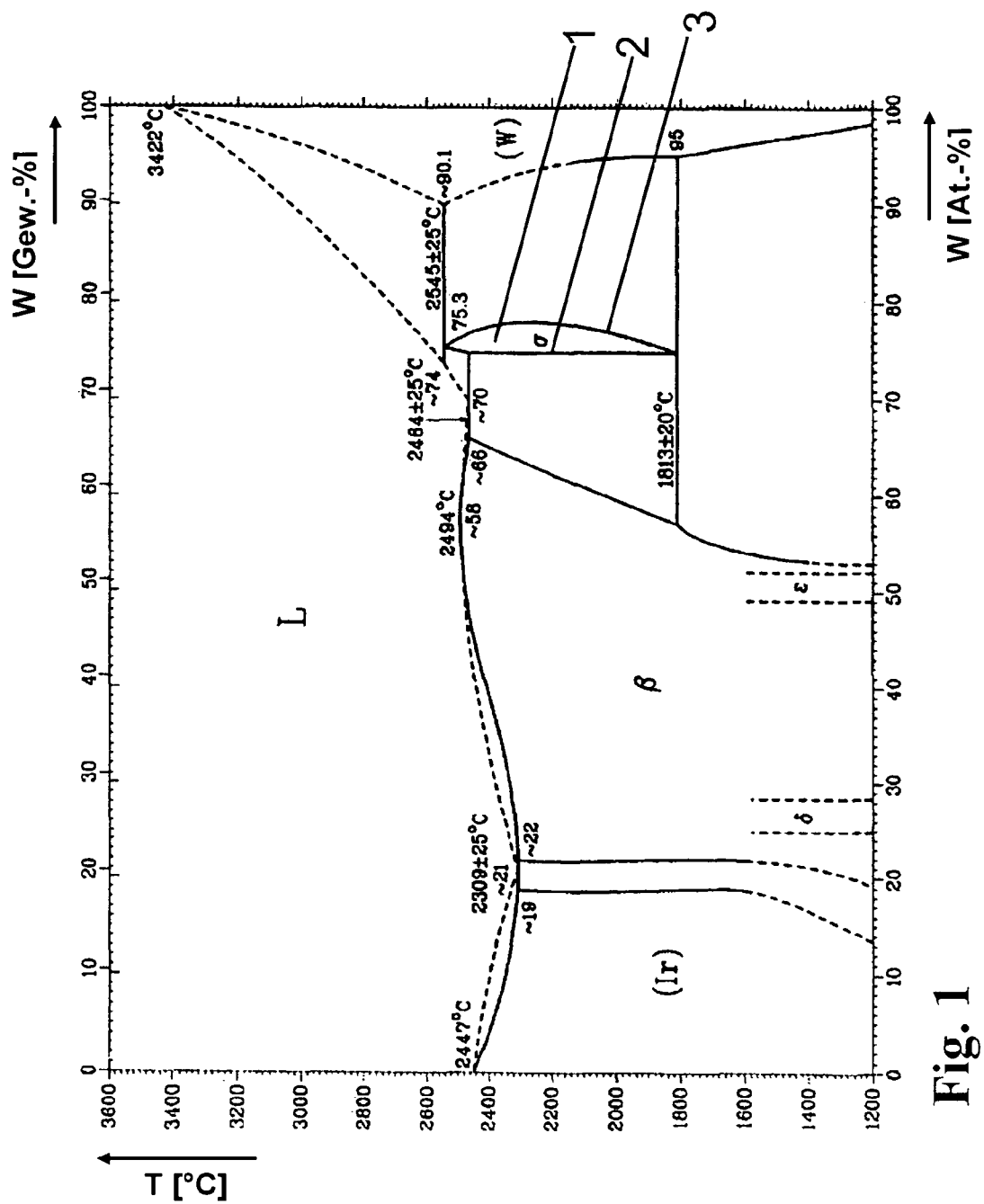
FIG. 1 a section taken from the phase diagram of the two-component system tungsten/iridium.

The phase diagram of the two-component system tungsten/iridium according to FIG. 1 is taken from the ASM Handbook: "Alloy Phase Diagrams". The W content is plotted in atom % (at. %) on the lower X-axis. A phase region 1 designated as "σ" (sigma phase) is inter alia plotted in the relevant temperate range between 2000° C. and 2450° C. This phase region extends between an Ir-rich phase boundary line 2 with a W content around 75 at. % and a W-rich phase boundary line 3 with a W content around 80 at. %. On the basis of tests in which iridium-coated tungsten components were exposed to temperatures in the range of 2000° C. to 2300° C. and were annealed at said temperatures for holding periods of different length in time, it has been found that the iridium layer is gradually converted into the sigma phase 1 (see also FIG. 2) and that consequently the sigma phase 1 in the 2-component system W—Ir represents the thermodynamically stable phase at temperatures around 2200° C.

On the basis of this finding, the inner wall of a crucible of tungsten was provided in portions with protective layers of different compositions, as indicated in Table 1.

TABLE 1

| Test no. | Ir content [at. %] | W content [at. %] | Result |
|---|---|---|---|
| 1 | 20 | 80 | No noticeable outdiffusion of tungsten into the protective layer, excellent adhesion of the protective layer, no holes |
| 2 | 50 | 50 | Diffusion to an acceptable extent, good adhesion |
| 3 | 100 | 0 | Considerable indiffusion of W into the Ir surface layer, many holes in the area of the boundary, low adhesion |
| 4 | 5 | 95 | Noticeable change in the surface layer; comparatively low corrosion resistance to quartz glass melt |

The protective layers on the W base body were each produced by vacuum plasma spraying (VPS method), a pure Ir powder with a grain size in the range between 10 μm and 100 μm being used for the iridium portion, and a pure W powder with a similar grain size being used as start material for the tungsten portion. The thickness of the layers produced in this way was each time about 100 μm.

The crucible provided in this way with different layer portions was then heated to a temperature of 2150° C. and held at this temperature for 40 days. The crucible was then cooled, and the quality of the boundary between the crucible base body and the respective material layer was assessed by way of micrographs, and REM/EDX measurements for phase analysis and for determining the chemical composition were carried out in addition. Qualitative assessments of the bond between base body and protective layer are indicated in the last column of Table 1.

REM/EDX measurements show considerable diffusion of tungsten out of the base body into the protective layer of iridium for sample 3 with a protective layer of pure iridium. As can be seen from micrographs, elongated holes are formed in the near-boundary region of the tungsten base body, said holes extending in parallel with the boundary between base body and protective layer and having dimensions of more than 100 μm in part. The reason for these holes in the near-boundary region is apparently a substance transportation of tungsten out of the base body into the iridium layer.

Figure 2:
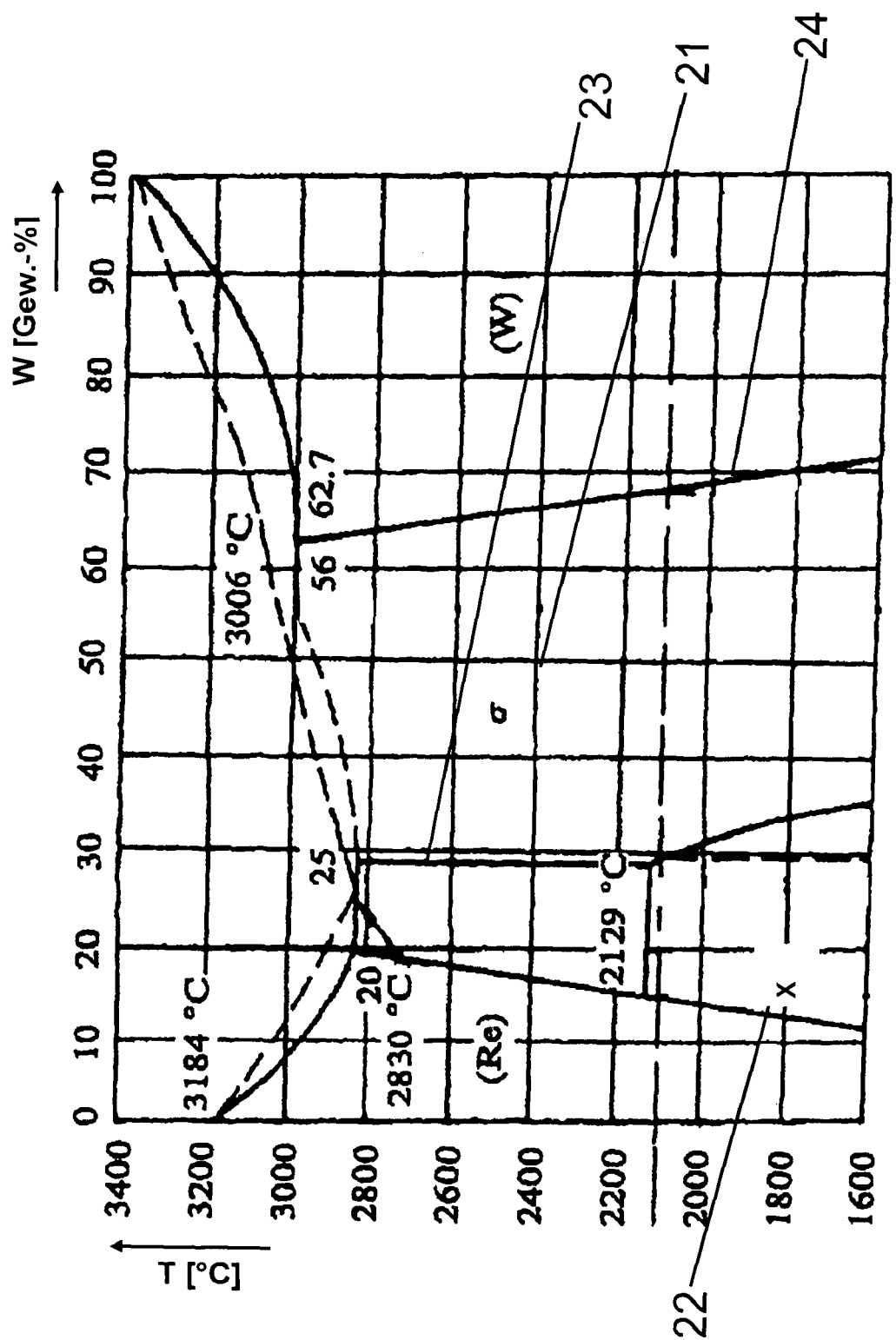
FIG. 2 a section taken from the phase diagram of the two-component system tungsten/rhenium.

FIG. 2 shows a section taken from the phase diagram of the two-component system tungsten/rhenium. This diagram is taken from the technical article "Diffusion layer at the interface of W/Re-composite nozzles" by Yin Weihong, Song Penli, published in High Temperatures—High Pressures, 1994, Vol., 26, pp. 115-121. The W content is plotted in % by wt. on the X-axis. A phase region 21 designated as "σ" and a phase region 22 designated as "X" are inter alia plotted in the relevant temperature range between 2000° C. and 2450° C. Following first tests both phases seem to be thermodynamically stable in the said temperature range.

For saving an amount of coating metal that is as great as possible, the phase region 21 (σ) is of particular interest to the present invention. This phase region extends between an Re-rich phase boundary line 23 with an Re content around 70% by wt. and a W-rich phase boundary line 24 with a W content of around 65% by wt.

On the basis of tests in which rhenium-coated tungsten components were exposed to temperatures in the range between 2000° C. and 2300° C. and annealed at said temperatures for hold times of different length, it has been found that the σ phase 21 is the quantitatively relevant phase. Apart from this, there is also a small amount of x-phase 22.

On the basis of this finding, the inner wall of a crucible of tungsten was provided in portions with protective layers of different compositions, as indicated in Table 2.

TABLE 2

| Test no. | Re content [at. %] | W content [at. %] | Result |
|---|---|---|---|
| 1 | 45 | 55 | No outdiffusion of rhenium into the W base body, good adhesion of the protective layer, no holes |
| 2 | 70 | 30 | Small outdiffusion of rhenium into the W base body, good adhesion of the protective layer, no holes |
| 3 | 100 | 0 | Considerable indiffusion of Re into the W base body, some holes in the area of the boundary, low adhesion |
| 4 | 5 | 95 | Considerable change in the surface layer, comparatively low corrosion resistance to quartz glass melt |

The protective layers on the W base body were each produced by vacuum plasma spraying (VPS method), and pure start powders with grain sizes in the range between 10 μm and 100 μm were each time used for the rhenium portion and the tungsten portion. The layer thickness applied was each time about 100 μm.

The crucible provided in this way with different layer portions was heated to a temperature of 2200° C. and held at this temperature for 7 days. The crucible was then cooled, and the quality of the boundary between the crucible base body and the respective material layer was assessed by way of micrographs, and REM/EDX measurements for phase analysis and for determining the chemical composition were carried out in addition. Qualitative assessments of the bond between base body and protective layer are indicated in the last column of Table 2.

The invention claimed is:

1. A component for use at a high working temperature in a crucible drawing method for quartz glass, said component comprising:
   a base body comprising a wall of tungsten or a tungsten-containing high temperature-resistant alloy;
   said wall being covered at least in part with a protective layer containing a coating metal selected from the group consisting of iridium, rhenium, osmium and ruthenium;
   wherein the protective layer is of a layer material containing tungsten and the coating metal;
   the coating metal being in an amount that exceeds a limit amount thereof of a coating metal-rich phase boundary of a solid mixture phase of tungsten and
   the coating metal with the solid mixture phase being thermodynamically stable at the working temperature, by not more than 25 at. % based on the total amount of tungsten and the coating metal in the layer material; and
   wherein the layer material contains iridium as the coating metal, and the iridium amount based on the total amount of tungsten and iridium in the layer material is not more than 50 at. %, and at least 5 at. %.

2. The component according to claim 1, wherein the amount of the coating metal in the layer material exceeds the limit amount of the coating metal-rich phase boundary of the thermodynamically stable solid mixture phase by not more than 15 at. %.

3. The component according to claim 2, wherein the amount of the coating metal in the layer material exceeds the limit amount of the coating metal-rich phase boundary of the thermodynamically stable solid mixture phase by not more than 10 at. %.

4. The component according to claim 1, wherein the amount of the coating metal in the layer material is not more than 15 at. % below a limit amount of a tungsten-rich phase boundary of the solid mixture phase that is thermodynamically stable at the working temperature.

5. The component according to claim 4, wherein the amount of the coating metal in the layer material is not more than 5 at. % below the limit amount of the tungsten-rich phase boundary of the solid mixture phase that is thermodynamically stable at the working temperature.

6. The component according to claim 1, wherein at least 70% by wt. of the layer material comprises the coating metal and tungsten.

7. The component according to claim 1, wherein at least 90% by wt. of the layer material comprises the coating metal and tungsten.

8. The component according to claim 1, wherein said component is a crucible.

9. A component for use at a high working temperature in a crucible drawing method for quartz glass, said component comprising:
   a base body comprising a wall of tungsten or a tungsten-containing high temperature-resistant alloy;
   said wall being covered at least in part with a protective layer containing a coating metal selected from the group consisting of iridium, rhenium, osmium and ruthenium;
   wherein the protective layer is of a layer material containing tungsten and the coating metal;
   the coating metal being in an amount that exceeds a limit amount thereof of a coating metal-rich phase boundary of a solid mixture phase of tungsten and
   the coating metal with the solid mixture phase being thermodynamically stable at the working temperature, by not more than 25 at. % based on the total amount of tungsten and the coating metal in the layer material; and
   wherein the layer material contains iridium as the coating metal, and the iridium amount based on the total amount of tungsten and iridium in the layer material is not more than 35 at. %, and at least 15 at. %.

10. The component according to claim 9, wherein the amount of the coating metal in the layer material exceeds the limit amount of the coating metal-rich phase boundary of the thermodynamically stable solid mixture phase by not more than 15 at. %.

11. The component according to claim 10, wherein the amount of the coating metal in the layer material exceeds the limit amount of the coating metal-rich phase boundary of the thermodynamically stable solid mixture phase by not more than 10 at. %.

12. The component according to claim 9, wherein the amount of the coating metal in the layer material is not more than 15 at. % below a limit amount of a tungsten-rich phase boundary of the solid mixture phase that is thermodynamically stable at the working temperature.

13. The component according to claim 12, wherein the amount of the coating metal in the layer material is not more than 5 at. % below the limit amount of the tungsten-rich phase boundary of the solid mixture phase that is thermodynamically stable at the working temperature.

14. The component according to claim 9, wherein at least 70% by wt. of the layer material comprises the coating metal and tungsten.

15. The component according to claim 9, wherein at least 90% by wt. of the layer material comprises the coating metal and tungsten.

16. The component according to claim 9, wherein said component is a crucible.

17. A component for use at a high working temperature in a crucible drawing method for quartz glass, said component comprising:
   a base body comprising a wall of tungsten or a tungsten-containing high temperature-resistant alloy;
   said wall being covered at least in part with a protective layer containing a coating metal selected from the group consisting of iridium, rhenium, osmium and ruthenium;
   wherein the protective layer is of a layer material containing tungsten and the coating metal;
   the coating metal being in an amount that exceeds a limit amount thereof of a coating metal-rich phase boundary of a solid mixture phase of tungsten and
   the coating metal with the solid mixture phase being thermodynamically stable at the working temperature, by not more than 25 at. % based on the total amount of tungsten and the coating metal in the layer material; and
   wherein the layer material contains rhenium as the coating metal, and the rhenium amount based on the total amount of tungsten and rhenium in the layer material is not more than 75 at. %, and at least 40 at. %.

18. The component according to claim 17, wherein the amount of the coating metal in the layer material exceeds the limit amount of the coating metal-rich phase boundary of the thermodynamically stable solid mixture phase by not more than 15 at. %.

19. The component according to claim 18, wherein the amount of the coating metal in the layer material exceeds the limit amount of the coating metal-rich phase boundary of the thermodynamically stable solid mixture phase by not more than 10 at. %.

20. The component according to claim 17, wherein the amount of the coating metal in the layer material is not more than 15 at. % below a limit amount of a tungsten-rich phase boundary of the solid mixture phase that is thermodynamically stable at the working temperature.

21. The component according to claim 20, wherein the amount of the coating metal in the layer material is not more than 5 at. % below the limit amount of the tungsten-rich phase boundary of the solid mixture phase that is thermodynamically stable at the working temperature.

22. The component according to claim 17, wherein at least 70% by wt. of the layer material comprises the coating metal and tungsten.

23. The component according to claim 17, wherein at least 90% by wt. of the layer material comprises the coating metal and tungsten.

24. The component according to claim 17, wherein said component is a crucible.

* * * * *